United States Patent [19]
Tsurutani et al.

[11] Patent Number: 5,342,695
[45] Date of Patent: Aug. 30, 1994

[54] LAMINATED FILMS

[75] Inventors: Iwao Tsurutani, Chiba; Takafumi Manabe, Sakai; Ikuo Emoto, Sakai; Isao Nagayasu, Sakai; Yoshitaka Okada, Sakai, all of Japan

[73] Assignees: Ube Rexene Corporation, Tokyo; Ube Industries, Ltd., Ube, both of Japan

[21] Appl. No.: 946,075

[22] Filed: Sep. 18, 1992

[30] Foreign Application Priority Data

Sep. 20, 1991 [JP] Japan .................. 3-241238
May 14, 1992 [JP] Japan .................. 4-121760
Jun. 18, 1992 [JP] Japan .................. 4-159503

[51] Int. Cl.$^5$ ............................. B32B 27/08
[52] U.S. Cl. ............................. 428/516; 428/520
[58] Field of Search ................. 428/516, 520

[56] References Cited

U.S. PATENT DOCUMENTS 3,607,616  9/1971  Barbehenn et al. ............... 156/334
4,163,080  7/1979  Buzio et al. .

FOREIGN PATENT DOCUMENTS 0126640   11/1984  European Pat. Off. .
0403678   12/1990  European Pat. Off. .
2815855   10/1978  Fed. Rep. of Germany .
2361225    3/1978  France .
57-210852 12/1982  Japan .
60-85948   5/1985  Japan .
63-19255   1/1988  Japan .
1-195043   8/1989  Japan .
1582186   12/1990  United Kingdom .

Primary Examiner—Edith Buffalow
Attorney, Agent, or Firm—Armstrong, Westerman, Hattori, McLeland & Naughton

[57] ABSTRACT

A laminated film has layer(s) A and layer(s) $B_1$, obtained by laminating at least one layer A and at least one layer $B_1$. The layer A comprises a resin composition comprising (a) 20–100% by weight of an amorphous polyolefin containing at least one component, in an amount of at least 50% by weight in said amorphous polyolefin, selected from the group consisting of propylene and butene-1 and (b) 80–0% by weight of a crystalline polypropylene, (B) the layer $B_l$ comprises a crystalline polypropylene. At least one of the two outermost layer is the layer $B_1$. The laminated films can be used in various applications by themselves, but may be laminated with a polyester film, a nylon film, a stretched polypropylene film or the like to improve the mechanical strengths, gas-barrier property, printability, etc.

9 Claims, No Drawings

LAMINATED FILMS

BACKGROUND OF THE INVENTION

The present invention relates to laminated films each constituted by at least two layers. More particularly, the present invention relates to laminated films having flexibility, mechanical strength, transparency, surface wettability, low-temperature sealability, etc., which are each a soft film comparable to a soft vinyl chloride resin film and a vinylon film.

In recent years, soft vinyl chloride resin films containing a plasticizer have been widely used as a soft resin film. Soft vinyl chloride resins, however, may give rise to social problems such as (1) toxicity caused by bleed-out of plasticizer of monomer used therein, (2) transition and (3) acid rain derived from hydrogen chloride generated by burning thereof.

Meanwhile, as a soft resin film similar to the soft vinyl chloride resin films, there are resin films using ethylene as a main component, such as ethylene/vinyl acetate copolymer film, low-density polyethylene film, ionomer film and the like. These ethylene-based soft resin films, however, are inferior to soft vinyl chloride resin films in transparency, haze, gloss, etc. and moreover have poor impact strength, heat resistance, and stiffness.

A vinylon film widely used for fiber packaging has an excellent feeling of flexibility but, unlike polyolefin films, is extremely costly.

Meanwhile, in crystalline polypropylene films, it is conducted to impart flexibility while maintaining their transparency and haze, by using a propylene random copolymer of reduced melting point obtained by randomly copolymerizing propylene and ethylene and/or an α-olefin. With any existing technique, however, it is difficult to allow a crystalline polypropylene resin to have a flexibility comparable to that of soft vinyl chloride resin.

In view of the above situation, the present invention is intended to provide a resin film which has good transparency, haze, gloss, etc., which has excellent flexibility and mechanical strength, and which has good impact resistance, surface wettability, low-temperature sealability, etc.

The present invention is also intended to provide a resin film suitably used, because of the above properties, in various applications, for example, a packaging film on which multi-colored decorative printing has been made (e.g. food-packaging film, fiber-packaging film), a transfusion bag and intravenous bag film used in medical care field, a metal-protecting film, an adhesive film, and a building material film used in civil engineering and construction fields.

SUMMARY OF THE INVENTION

According to the present invention there is provided a laminated film having layer(s) A and layer(s) $B_1$, obtained by laminating at least one layer A and at least one layer $B_1$, wherein
 (A) the layer A comprises a resin composition comprising (a) 20–100% by weight of an amorphous polyolefin containing at least one component selected from the group consisting of propylene and butene-1, in an amount of 50% by weight or more and (b) 80–0% by weight of a crystalline polypropylene,
 (B) the layer $B_1$ comprises a crystalline polypropylene, and at least one of the two outermost layers is the layer $B_1$.

According to the present invention there is further provided a laminated film having layer(s) A and layer(s) $B_2$, obtained by laminating at least one layer A and at least one layer $B_2$, wherein
 (A) the layer A comprises a resin composition comprising (a) 20–100% by weight of an amorphous polyolefin containing at least one component selected from the group consisting of propylene and butene-1, in an amount of 50% by weight or more and (b) 80–0% by weight of a crystalline polypropylene,
 (B) the layer $B_2$ comprises an ethylene (co)polymer resin, and at least one of the two outermost layers is the layer $B_2$.

According to the present invention there is furthermore provided a laminated film having layer(s) A and layer (s) $B_3$, obtained by laminating at least one layer A and at least one layer $B_3$, wherein
 (A) the layer A comprises a resin composition comprising (a) 20–100% by weight of an amorphous polyolefin containing at least one component selected from the group consisting of propylene and butene-1, in an amount of 50% by weight or more and (b) 80–0% by weight of a crystalline polypropylene,
 (B) the layer $B_3$ comprises a crystalline polypropylene and an ethylene (co)polymer resin having polarity, and at least one of the two outermost layers is the layer $B_3$.

The laminated films of the present invention are constituted as above. By subjecting to composite lamination (e.g. co-extrusion or lamination) a layer comprising an amorphous polyolefin containing propylene and a crystalline polypropylene and a layer comprising a crystalline polypropylene, there can be obtained a laminated film having excellent transparency, haze and gloss, retaining the mechanical strength inherently possessed by polypropylene, and having high flexibility.

By subjecting to the same composite lamination as above a layer comprising an amorphous polyolefin containing propylene and/or butene-1 and a crystalline polypropylene and a layer comprising an ethylene (co)polymer resin, there can be obtained a laminated film having the above properties and excellent low-temperature sealability.

By subjecting to the same treatment as above a layer comprising an amorphous polyolefin containing propylene and/or butene-1 and a crystalline polypropylene and a layer comprising a crystalline polypropylene and an ethylene (co)polymer resin having a polar group, there can be obtained a laminated film having the above properties and excellent surface wettability.

DETAILED DESCRIPTION OF THE INVENTION

The present inventors made a study in order to achieve the above objects. As a result, the present inventors found that the above objects can be met by laminated films each constituted by a layer comprising an amorphous polyolefin of particular composition or said amorphous polyolefin and a crystalline polypropylene at a desired ratio and a layer which is an appropriate combination of a crystalline polypropylene, an ethylene (co)polymer resin and an ethylene (co)polymer resin having a polar group. The finding has led to the completion of the present invention.

The laminated films of the present invention are described in detail below.

In the laminated films of the present invention, the amorphous polyolefin used in the layer A (hereinafter referred to as amorphous polyolefin) can be any amorphous olefin polymer containing propylene and/or butene-1 in an amount of 50% by weight or more. There can be used, for example, an amorphous polylpropylene, a polybutene-1, or a copolymer of propylene and/or butene-1 and other α-olefin. When the propylene and/or butene-1 content in the amorphous polyolefin is less than 50% by weight, the amorphous polyolefin has low compatibility with a crystalline polypropylene; hence, such a propylene and/or butene-1 content is not desirable.

The amorphous polyolefin has a boiling-n-heptane insoluble (i.e. a boiling-n-heptane when subjected to Soxhlet extraction) of 70% by weight or less, preferably 60% by weight or less. When the boiling-n-heptane insoluble is more than 70% by weight, the proportion of the amorphous portion in the amorphous polyolefin is small, making it impossible to obtain a resin film having the desired sufficient flexibility. The amorphous polyolefin in the layer A further has a number-average molecular weight of preferably 1,000-200,000, more preferably 1,500-100,000. When the number-average molecular weight is more than 200,000, film molding is difficult. When the number-average molecular weight is less than 1,000, the resulting film has low mechanical strength. In the present invention, the amorphous polyolefin can be used singly or in combination of two or more kinds.

As the amorphous polyolefin, there may be used an atactic polypropylene which is produced as a by-product in producing a crystalline polypropylene. Alternatively, the amorphous polyolefin may be produced as such from a raw material. The copolymer of propylene and/or butene-1 and other α-olefin can be produced as an intended product from raw materials so as to contain propylene and/or butene-1 in a desired proportion.

When the amorphous polyolefin is produced as an intended product, it can be obtained by, for example, polymerizing raw material monomers using (a) a titanium catalyst supported on magnesium chloride and (b) triethylaluminum, in the presence or absence of hydrogen. Use of an amorphous polyolefin produced as an intended product is preferable in view of its stable supply and stable quality. As the amorphous polyolefin, there may be used a commercial product if there is an appropriate commercial product.

Specific examples of the amorphous polyolefin used in the layer A of the present invention include those containing propylene as a main component in a given proportion and having desired properties, such as polypropylene, propylene/ethylene copolymer, propylene/butene-1 copolymer, propylene/hexene-1 copolymer, propylene/butene-1/ethylene terpolymer, propylene/hexene-1/octene-1 terpolymer, propylene/hexene-1/4-methylpentene-1 terpolymer and the like.

Specific examples of the amorphous polyolefin also include those containing butene-1 in a given proportion and having desired properties, such as polybutene-1, butene-1/ethylene copolymer, butene-1/propylene copolymer, butene1/propylene/ethylene terpolymer, butene-1/hexene-1/octene-1 terpolymer, butene-1/hexene-1/4-methylpentene-1 terpolymer and the like.

When the amorphous polyolefin is a propylene/ethylene copolymer, the copolymer desirably has an ethylene content of 0-30% by weight, preferably 1-20% by weight. When the ethylene content is larger than 30% by weight, the resulting film is too soft.

When the amorphous polyolefin in the layer A of the present invention is a propylene/butene-1 copolymer, the propylene/butene-1 copolymer has three types, (1) a copolymer containing propylene as a main component, (2) a copolymer containing butene-1 as a main component, and (3) a copolymer containing both propylene and butene-1 as its main components.

Each of these copolymers desirably has its main component(s) of 50% by weight or more, the other component(s) of less then 50%, preferably 1-45% by weight, more preferably 5-44% by weight.

The propylene/butene-1 copolymer has high tensile elongation and cohesiveness and can be suitably used as the amorphous polyolefin of the layer A. An example of the commercial products of the propylene/butene-1 copolymer usable in the layer A is REXTAC of Rexene Co. of U.S.A.

The crystalline polypropylene used in the layer A of the present invention refers to an isotactic polypropylene insoluble in boiling n-heptane and includes commercially available polypropylenes used for extrusion, injection molding, blow molding, etc. It may be a propylene homopolymer, or a copolymer between an isotactic polypropylene of stereoregularity and other α-olefin.

As the crystalline polypropylene, there may be used a commercial product or a product produced as such. The production of crystalline polypropylene is not critical and can be conducted using a process appropriately selected from conventional processes used for production of crystalline polypropylene.

The α-olefin used in copolymerization with a crystalline polypropylene is preferably an α-olefin of 2-8 carbon atoms, such as ethylene, butene-1, pentene-1, hexene-1, heptene-1, octene-1 or the like. Of these, ethylene or butene-1 is particularly preferable.

In the present invention, as the crystalline polypropylene, there are preferably mentioned a propylene homopolymer; a propylene/ethylene random or block copolymer having an ethylene content of 30% by weight or less, preferably 1-25% by weight; a propylene/butene-1 random or block copolymer having a butene-1 content of 20% by weight or less. Of these, a copolymer between ethylene or butene-1 and propylene is particularly preferable in view of the applications (film, sheet, etc.) of the present resin composition. The crystalline polypropylene of the layer A can be used singly or in combination of two or more kinds.

In the present invention, the amorphous polyolefin and/or crystalline polypropylene of the layer A may be used in modified forms (form). That is, the amorphous polyolefin or crystalline polypropylene may be used after being modified with an unsaturated carboxylic acid (e.g. acrylic acid, methacrylic acid, ethacrylic acid, maleic acid, fumaric acid, itaconic acid) and/or its derivatives (e.g. ester, acid anhydride, metal salt) or with other unsaturated compound (e.g. amide, amino compound, glycidyl methacrylate, hydroxymethacrylate). Of the modification products, preferable is a product modified with maleic anhydride or itaconic anhydride, and more preferable is a product modified with maleic anhydride.

In the present invention, the production of the resin composition of the layer A containing the amorphous polyolefin and the crystalline polypropylene is not critical and can be carried out by a method ordinarily used in the production of conventional polypropylene compositions, wherein melt kneading is conducted with heating, using, for example, a kneader (e.g. kneader, Banbury mixer, rolls) or a single-screw or twin-screw extruder.

In the present invention, the resin composition constituting the layer A may contain, as necessary, various additives and fillers, such as heat stabilizer, antioxidant, light stabilizer, antistatic agent, lubricant, nulcleating agent, flame retardant, pigment or dye, calcium carbonate, calcium sulfate, barium sulfate, magnesium hydroxide, mica, talc, clay and the like. The resin composition may further contain, as necessary, other thermoplastic resins, thermoplastic elastomers, rubbers, etc. It is possible that these resins, elastomers, rubbers, etc. be compounded so as to form a crosslinked structure. When flame retardancy is imparted to the resin composition, magnesium hydroxide or magnesium carbonate is added in an amount of 20–60 parts by weight of laminated film.

The resin composition of the layer A of the present invention comprises the amorphous polyolefin alone or the amorphous polyolefin and the crystalline polypropylene, and can be obtained by using the amorphous polyolefin in a proportion of 20–100% by weight, preferably 25–100% by weight. When the proportion of the amorphous polyolefin is less than 20% by weight, sufficient flexibility cannot be obtained.

The crystalline polypropylene used in the layers $B_1$ and $B_3$ of the present invention may be the same crystalline polypropylene as used in the layer A. It is particularly preferably a propylene random copolymer having a melting point of 150° C. or less so that the resulting laminated film can have a feature of soft film.

As the ethylene (co)polymer resin used in the layer $B_2$, there are mentioned a low-density polyethylene, a linear low-density polyethylene, a very-low-density polyethylene, a medium-density polyethylene, a high-density polyethylene and a copolymer containing ethylene as a main component. The copolymer includes copolymers and multi-component polymers between ethylene and at least one comonomer selected from olefins (e.g. propylene, butene, pentene, hexene, heptene, octene), vinyl esters (e.g. vinyl acetate, vinyl propionate), unsaturated carboxylic acid esters (e.g. methyl acrylate, ethyl acrylate, methyl methacrylate, ethyl methacrylate) and salts of metal unsaturated carboxylates thereof. The ethylene (co)polymer resin may be a combination of two or more polymers or copolymers. It may also be a modification product as in the case of the amorphous polyolefin and/or the crystalline polypropylene of the layer A.

The ethylene (co)polymer resin having a polar group, used in the layer $B_3$ may be a copolymer between ethylene and a vinyl monomer having a polar group, or a graft polymer obtained by grafting a vinyl monomer having a polar group, to an ethylene (co)polymer resin.

As the former, there can be used copolymers or multi-component polymers between ethylene and unsaturated acid(s), unsaturated ester(s) or salts of metal unsaturated carboxylates thereof, such as ethylene/vinyl acetate copolymer, ethylene/acrylic acid copolymer, ethylene/ethyl acrylate copolymer, ethylene/methyl methacrylate copolymer, ethylene/glycidyl methacrylate and other ionomers. It is possible to use two or more copolymers or multi-component polymers in combination.

As the latter, there can be used modification products obtained by grafting (modification) with an unsaturated carboxylic acid (e.g. acrylic acid, methacrylic acid, ethacrylic acid, maleic acid, fumaric acid, itaconic acid) and/or a derivative thereof (e.g. ester, acid anhydride, metal salt). Of these modification products, there are preferably used those modified with maleic anhdyride or itaconic anhydride, more preferably those modified with maleic anhydride.

The hardness of the ethylene (co)polymer resin of the layers $B_2$ and $B_3$ is not critical but is preferably 50 or less in terms of Shore D hardness because the layers are used as part of a soft film. As the ethylene (co)polymer resin having a Shore D hardness of 50 or less, there are mentioned a low-density polyethylene, a linear low-density polyethylene, a very-low-density polyethylene, an ethylene/vinyl acetate copolymer, an ethylene/ethyl acrylate copolymer, ionomers, etc.

The ratio of the crystalline polypropylene and the ethylene (co)polymer resin having a polar group in the layer $B_3$ is not critical but is preferably 98:2 to 50:50, more preferably 95:5 to 60:40 in view of the compatibility of the two components and the transparency of the layer.

The concentration of the monomer having a polar group in the ethylene (co)polymer resin or the concentration of the graft component (e.g. acid) in the ethylene (co)polymer resin is preferably 0.01–30% by weight, more preferably 0.05–20% by weight based on the total resin of the $B_3$ layer in order for the surface of the resulting film to exhibit desired wettability and adhesivity.

The laminated films of the present invention are ordinarily constituted in such a manner that the layer A and the layer $B_1$, $B_2$ or $B_3$ are laminated alternately in the above-mentioned combination. The number of the layer A and the layer $B_1$, $B_2$ or $B_3$ used has no restriction, but at least one layer A and at least one layer $B_1$, $B_2$ or $B_3$ are laminated so that at least one of the two outermost layers is the layer $B_1$, $B_2$ or $B_3$. The laminated films can be constituted in various combinations such as $B_1/A$, $B_2/A/B_2$, $B_3/A/B_3/A/B_3$ and the like. Three-layered laminated films such as $B_1/A/B_1$ and the like are generally used. It is possible to use a combination of $B_1/A/X$ by laminating X (a resin than A and $B_1$) onto the layer A of $B_1/A$.

In the present invention, the layer A contributes in imparting flexibility to the resulting film. Containing a crystalline polypropylene, the layer A can also endow the resulting film with heat resistance, firmness and elasticity. Meanwhile, the amorphous polyolefin also contained in the layer A has high surface adhesivity; therefore, when an amorphous polyolefin of low molecular weight is used, the resulting film has striking surface adhesivity.

The $B_2$ layer contributes in imparting not only the above-mentioned properties but also low-temperature sealability. Therefore, the resulting laminated film has excellent low-temperature sealability. With the layer $B_3$, the polar group is exposed on the surface; therefore, using the layer $B_3$, there can be obtained a laminated film making easy adhesive coating and multi-color or complex printing.

In the laminated films of the present invention, it is possible to insert, between the layer A and the layer $B_1$, $B_2$ or $B_3$, another thermoplastic resin, for example, a nylon, a poly(vinyl alcohol), a saponified EVA, polyester, etc., in order to impart a gas-barrier property.

In the present invention, the thickness of each layer constituting the laminated films is not critical and can be determined as desired. However, each layer is ordinarily produced so as to have a thickness in the range of about 2–1,000 mm. The thickness ratio of the layer A and the layer $B_1$, $B_2$ or $B_3$ is not critical, either. However, the total thickness of the layer(s) A is determined so as to be preferably 20–99%, more preferably 30–95% of the total thickness of laminated film in order for the layer A to contribute to film flexibility and for the layer $B_1$, $B_2$ or $B_3$ to serve to suppress surface adhesivity.

The method for producing the laminated films of the present invention has no particular restriction. There can be used, for example, a co-extrusion lamination method, a lamination method, or a dry lamination method. Of these, there is preferred the co-extrusion lamination method wherein melt adhesion is conducted. The co-extrusion lamination is specifically conducted, for example, by carrying out melt extrusion using extruders (the number of the extruders is the same as that of the layers in the laminated film produced), laminating the extrudates in a molten state by a known method such as T-die method, inflation method or the like, then cooling the resulting laminate with cooling rolls, air or water to obtain a laminated film.

The laminated films of the present invention can be subjected to a surface treatment in order to improve the printability, laminatability and adhesive coatability. The method for the surface treatment includes a corona discharge treatment, a plasma treatment, a flame treatment, an acid treatment, etc. Any of these methods can be used in the present invention. The plasma treatment, the flame treatment, or the corona treatment is preferable because it enables continuous treatment and can be easily carried out before the winding step. Of them, the corona treatment is most preferable in view of the convenience. The laminated films of the present invention may be stretched monoaxially or biaxially.

The laminated films of the present invention are subjected, after the above-mentioned lamination, cooling and solidification, to the above treatment as necessary, wound, and subjected to secondary steps (e.g. printing, lamination, adhesive coating, heat sealing). The thus obtained films can be used in intended applications.

The laminated films of the present invention can be used in various applications by themselves, but may be laminated with a polyester film, a nylon film, a stretched polypropylene film or the like to improve the mechanical strength, gas-barrier property, printability, etc.

The present invention is described in more detail below by way of Examples. However, the present invention is by no means restricted by the Examples.

In the following Examples of the present invention, individual test items were measured in accordance with the following methods.

[Tensile properties]
Tensile properties were measured in accordance with JIS Z 1702 and evaluated in the following four items, i.e. (1) tensile yield strength (Kgf/cm$^2$), (2) tensile break strength (Kgf/cm$^2$), (3) tensile elongation (%) and (4) tensile modulus (Kgf/cm$^2$).

[Haze (%)]
Measured in accordance with ASTM D 1003.

[Gloss (%)]
Measured in accordance with ASTM D 2457.

[Elmendorf tear strength (kg/cm)]
Measured in accordance with JIS P 8116.

[Dart impact (g/26 in)]
Measured in accordance with ASTM D 1709.

[Heat-sealing temperature]
A sample was subjected to heat sealing at various temperatures. A lowest heat-sealing temperature at which an adhesion strength capable of giving rise to material breakage was obtained, was taken as a heat-sealing temperature of the sample.

[Wettability]
A film which had been subjected to a corona treatment at a voltage of 100 V, was coated with various wetting index standard solutions (manufactured by Kishida Kagaku K.K.) each having a numerical symbol, at a width of 1 cm. After 2 seconds, those standard solutions remaining at the original width (1 cm) were examined and the largest numerical symbol of these solutions was taken as the wettability (dyne/cm) of the film. (In a film having a small wettability, the width of coated solution became narrower than 1 cm after 2 seconds owing to the interfacial tension between the film and the coated solution.)

[Adhesivity]
A commercial cellophane tape (manufactured by Nichiban K.K.) was adhered to the corona-treated (100 V) surface of a film to prepare a sample for adhesivity. The sample was tested for adhesion strength by T-peel (crosshead speed: 200 mm/min, sample width: 24 mm).

EXAMPLES 1–4

[Preparation of resin composition for layer A]

As the resin composition constituting the layer A, there was used a resin composition prepared by mixing, at a 50/50 weight ratio, an amorphous polyolefin [REXTAC RT2780 (trade name) manufactured by Rexene Co.] having a density of 0.86 g/cm$^3$, a propylene content of 65% by weight, a butene-1 content of 35% by weight and a melt viscosity of 10,000 cp (190° C.) and a crystalline polypropylene [B301H (trade name) manufactured by Ube Industries, Ltd.] having a density of 0.90 g/cm$^3$ and a melt flow rate (MFR) (230° C.) of 1.0 g/10 min and then melt kneading the mixture at 200° C. for 30 minutes.

[Molding of laminated films]

There were used, for the layer A, the resin composition prepared above and, for the $B_1$ layer, a crystalline polypropylene [RF395 (trade name) manufactured by Ube Industries, Ltd.] having a density of 0.91 g/cm$^3$, a melt flow rate (MFR) (230° C.) of 9 g/10 min and a melting point of 138° C. The resin composition and the crystalline polypropylene were subjected to melt three-layer co-extrusion using three independent extruders and a three-layer die connected to the extruders, so as to give a $B_1/A/B_1$ thickness ratio shown in Table 1; the resulting laminate was subjected to airing and quenching with a water-cooled sizing ring; the cooled laminate was subjected to blow-up molding into a tube-shaped film; the film was immediately wound, whereby three-layered laminated films each having a total thickness shown in Table 1 were obtained. The three-layered laminated films were measured for properties. The results are shown in Table 1.

TABLE 1

| | Film Structure | | Film Properties | | | | | | | | | | | |
|---|---|---|---|---|---|---|---|---|---|---|---|---|---|---|
| | Total thickness (μ) | Ratio of Layer Thickness (B₁)/(A)/(B₁) | Tensile Yield Strength (23° C.) (kgf/cm²) | | Tensile Break Strength (23° C.) (kgf/cm²) | | Tensile Elongation (23° C.) (%) | | Tensile Modulus (23° C.) (kgf/cm²) | | Elmendorf Tear Strength (Kg/cm) | | Haze (%) | Gloss (%) | Dart Impact (g/26 inch) |
| | | | *1 | *2 | *1 | *2 | *1 | *2 | *1 | *2 | *1 | *2 | | | |
| Examples | | | | | | | | | | | | | | | |
| 1 | 50 | 1 / 4 / 1 | 103 | 99 | 398 | 340 | 786 | 851 | 1635 | 1846 | 79 | 210 | 0.5 | 131 | 878 |
| 2 | 50 | 1 / 2 / 1 | 119 | 110 | 456 | 354 | 769 | 815 | 1827 | 1850 | 56 | 217 | 0.5 | 135 | 878 |
| 3 | 100 | 1 / 4 / 1 | 105 | 102 | 367 | 328 | 811 | 828 | 2348 | 2249 | 102 | 128 | 0.5 | 161 | 1229 |
| 4 | 100 | 1 / 2 / 1 | 121 | 117 | 410 | 373 | 816 | 823 | 2344 | 2300 | 86 | 119 | 0.5 | 165 | 1141 |
| 5 | 50 | 1 / 4 / 1 | 90 | 88 | 353 | 310 | 810 | 840 | 1550 | 1675 | 85 | 231 | 0.4 | 132 | 850 |
| 6 | 50 | 1 / 4 / 1 | 120 | 115 | 436 | 375 | 815 | 853 | 2550 | 2650 | 53 | 92 | 0.7 | 136 | 658 |
| 7 | 100 | 1 / 2 / 2 | 138 | 129 | 473 | 406 | 798 | 853 | 2650 | 2910 | 90 | 228 | 2.0 | 131 | ≧1320 |
| 8 | 250 | 1 / 5 / 1 | 80 | 80 | 260 | 260 | 820 | 900 | 1400 | 1400 | ≧107 | ≧107 | 1.5 | 152 | ≧1320 |
| 9 | 60 | 1 / 2 / 1 | 123 | 121 | 470 | 382 | 790 | 790 | 1650 | 1680 | 124 | 160 | 0.7 | 145 | NB |
| 10 | 60 | 1 / 2 / 1 | 114 | 102 | 462 | 361 | 770 | 780 | 1500 | 1400 | 128 | 156 | 1.0 | 135 | NB |
| 11 | 60 | 1 / 2 / 1 | 138 | 136 | 482 | 399 | 710 | 713 | 1720 | 1790 | 138 | 169 | 2.5 | 138 | NB |
| Comparative Examples | | | | | | | | | | | | | | | |
| 1 | 50 | — | 112 | 108 | 244 | 253 | 384 | 645 | 1482 | 1625 | 52 | 65 | 6.8 | 88 | 172 |
| 2 | 50 | — | 139 | 131 | 422 | 407 | 779 | 1027 | 1936 | 2167 | 30 | 168 | 7.7 | 104 | 142 |
| 3 | 50 | — | 85 | 67 | 416 | 397 | 400 | 980 | 810 | 819 | 187 | 290 | 7.0 | 30 | 315 |
| 4 | 60 | — | 52 | 51 | 315 | 306 | 515 | 680 | 530 | 595 | 42 | 52 | 2.2 | 137 | 562 |
| 5 | 50 | — | 304 | 50 | 593 | 315 | 487 | 4 | 4152 | 4262 | 5 | 480 | 72.9 | 7 | 20 |
| 6 | 60 | — | 158 | 148 | 509 | 475 | 807 | 872 | 3460 | 3626 | 15 | 24 | 0.8 | 150 | 369 |

*1 denotes the lengthwise direction
*2 denotes the crosswise direction

EXAMPLE 5

A three-layered laminated film having a total thickness shown in Table 1 was obtained in the same manner as in Example 1 except that the mixing ratio of the amorphous polyolefin and the crystalline polypropylene was 70/30 in the resin composition for the layer A. The three-layered laminated film was measured for properties. The results are shown in Table 1.

EXAMPLE 6

A three-layered laminated film having a total thickness shown in Table 1 was obtained in the same manner as in Example 1 except that the mixing ratio of the amorphous polyolefin and the crystalline polypropylene was 30/70 in the resin composition for the layer A. The three-layered laminated film was measured for properties. The results are shown in Table 1.

EXAMPLES 7-8

[Resin composition for layer A]

As the resin constituting the layer A, there was used an amorphous polypropylene (boiling-n-heptane insoluble=46%, number-average molecular weight=48,000) having a density of 0.88 g/cm³ and an MFR (230° C.) of 8.4 g/10 min.

[Constitution of laminated films]

EXAMPLE 7

There were used, for the layer A, the above resin composition and, for the layer B₁, a crystalline polypropylene [FL453 (trade name) manufactured by Ube Industries, Ltd.] having a density of 0.90 g/cm³, an MFR (230° C.) of 2.7 g/10 min and a melting point of 139° C. The layer constitution was B₁/A/B and the ratio of layer thicknesses was as shown in Table 1.

EXAMPLE 8

There were used, for the layer A, the above resin composition and, for the layer B₁, a crystalline polypropylene [RF395 (trade name) manufactured by Ube Industries, Ltd.] having a density of 0.91 g/cm³, an MFR (230° C.) of 9.0 g/10 min and a melting point of 138° C. The layer constitution was B₁/A/B₁ and the ratio of layer thicknesses was as shown in Table 1.

[Molding of laminated films]

The resin composition and the crystalline polypropylene were subjected to melt three-layer co-extrusion using three independent extruders and a three-layer die connected to the extruders, so as to give the above film constitution; the resulting laminate was subjected to airing and quenching with a water-cooled sizing ring; the cooled laminate was subjected to blow-up molding into a tube-shaped film; the film was immediately wound, whereby three-layered laminated films each having a total thickness shown in Table 1 were obtained.

The three-layered laminated films were measured for properties. The results are shown in Table 1.

Comparative Example 1

As the material for film, there was used a low-density polyethylene (LDPE) [F019 (trade name) manufactured by Ube Industries, Ltd.] having a density of 0.92 g/cm³ and a melt index (MI) (190° C.) of 0.9 g/10 min. The material was passed through an extruder and an inflation film molding apparatus with a ring-shaped die to wind a tube-shaped film to obtain a LDPE single-layered film of 50 μm in thickness. The film was measured for properties. The results are shown in Table 1.

Comparative Examples 2-5

Using, as the film materials, a linear low-density polyethylene (LLDPE) [FB123M (trade name) manufactured by Ube Industries, Ltd.] having a density of 0.92 g/cm³ and an MI (190° C.) of 0.8 g/10 min in Comparative Example 2, a very-low-density polyethylene (VLDPE) [Z517A (trade name) manufactured by Ube Industries, Ltd.] having a density of 0.91 g/cm³ and an MI (190° C.) of 1.5 g/10 min in Comparative Example 3, an ethylene/vinyl acetate copolymer (EVA) [V215 (trade name) manufactured by Ube Industries, Ltd.]

having a density of 0.93 g/cm³, an MI (190° C.) of 2.0 g/10 min and a vinyl acetate content of 15% by weight in Comparative Example 4, and a high-density polyethylene (HDPE) [6000 (trade name) manufactured by Tosoh Corporation] having a density of 0.96 g/cm³ and an MI (190° C.) of 0.1 g/10 min in Comparative Example 5, there were obtained a LLDPE single-layered film (Comparative Example 2), a VLDPE single-layered film (Comparative Example 3), an EVA single-layered film (Comparative Example 4) and a HDPE single-layered film (Comparative Example 5) each having a thickness shown in Table 1, in the same manner as in Comparative Example 1. Each film was measured for properties. The results are shown in Table 1.

Comparative Example 6

A film of 60 μm in thickness was obtained in the same manner as in Example 1 except that the same crystalline polypropylene as used for the layer $B_1$ in Example 1 was subjected to three-layer co-extrusion using the same molding apparatus for three-layered laminated film, as used in Example 1. The film was measured for properties. The results are shown in Table 1.

EXAMPLE 9

A three-layered laminated film having a total thickness shown in Table 1 was obtained in the same manner as in Example 1. The three-layered laminated film was measured for properties. The results are shown in Table 1.

EXAMPLE 10

A three-layered laminated film having a total thickness shown in Table 1 was obtained in the same manner as in Example 1 except that in the resin used in the layer A, the mixing ratio of the amorphous polypropylene and the crystalline polypropylene was changed to 7/3. The three-layered laminated film was measured for properties. The results are shown in Table 1.

EXAMPLE 11

A three-layered laminated film having a total thickness shown in Table 1 was obtained in the same manner as in Example 1 except that the resin composition for layer A was prepared by mixing the same crystalline polypropylene (B301H) as used in Example 1 and a polybutene [M2481 (trade name) manufactured by Mitsui Petrochemical Industries, Ltd.] at a ratio of 50/50 and then melt-kneading the mixture using an extruder and that said resin composition was used as an intermediate layer of the laminated film. The three-layered laminated film was measured for properties. The results are shown in Table 1.

As is clear from Examples 1-11 and Comparative Examples 1-6, the three-layered laminated films of the present invention each consisting of one layer A and two layer $B_1$, as compared with the films of Comparative Examples 1-6, are well balanced in tensile elongation and other tensile properties, have flexibility and excellent mechanical strength, and have good transparency, haze and gloss in view of the haze and gloss values.

EXAMPLE 12

[Preparation of resin composition for layer A]
A resin composition was obtained in the same manner as in Example 1.
[Molding of laminated film]

There were used, for the layer A, the resin composition prepared above and, for the layer $B_2$, a low density polyethylene [F200 (trade name) manufactured by Ube Industries, Ltd.] having a density of 0.92 g/cm³, a Melt Index (MI) (190° C.) of 2 g/10 min.

The resin composition and the crystalline polypropylene were subjected to melt three-layer co-extrusion using three independent extruders and a three-layer die connected to the extruders, so as to give a $B_2/A/B_2$ thickness ratio shown in Table 2; the resulting laminate was subjected to airing and quenching with a water-cooled sizing ring; the cooled laminate was subjected to blow-down molding into a tube-shaped film; the film was immediately wound, whereby a three-layered laminated film having a total thickness shown in Table 2 were obtained. The three-layered laminated film was measured for properties. The results are shown in Table 3. The composition of the film is shown in Table 2.

EXAMPLE 13

A three-layered laminated film having a total thickness shown in Table 2 was obtained in the same manner as in Example 12 except that as the layer $B_2$ there was used a linear low-density polyethylene (LLDPE) [FA120N (trade name) manufactured by Ube Industries, Ltd.] having a density of 0.92 g/cm³ and an MI (190° C.) of 1.9 g/10 min. The three-layered laminated film was measured for properties. The results are shown in Table 3. The composition of the film is shown in Table 2.

EXAMPLE 14

A three-layered laminated film having a total thickness shown in Table 2 was obtained in the same manner as in Example 12 except that as the layer $B_2$ there was used a very-low-density polyethylene (VLDPE) [Z522 (trade name) manufactured by Ube Industries, Ltd.] having a density of 0.895 g/cm³ and an MI (190° C.) of 3.0 g/10 min. The three-layered laminated film was measured for properties. The results are shown in Table 3. The composition of the film is shown in Table 2.

EXAMPLE 15

A three-layered laminated film having a total thickness shown in Table 2 was obtained in the same manner as in Example 12 except that as the layer $B_2$ there was used an ethylene/vinyl acetate copolymer (EVA) [V215 (trade name) manufactured by Ube Industries, Ltd.] having a density of 0.93 g/cm³, an MI (190° C.) of 2.0 g/10 min and a vinyl acetate content of 15% by weight. The three-layered laminated film was measured for properties. The results are shown in Table 3. The composition of the film is shown in Table 2.

Comparative Example 7

As the material for film, there was used an ethylene/vinyl acetate copolymer (EVA) [V215 (trade name) manufactured by Ube Industries, Ltd.] having a density of 0.93 g/cm³. an MI (190° C.) of 2.0 g/10 min and a vinyl acetate content of 15% by weight. The material was passed through an extruder and an inflation film molding apparatus with a ring-shaped die to wind a tube-shaped film to obtain an EVA single-layered film of 60 μm in thickness. The film was measured for properties. The results are shown in Table 3.

Comparative Example 8

A LDPE single-layered film was obtained in the same manner as in Comparative Example 7 except that as the material for film there was used a low-density polyethylene [F200 (trade name) manufactured by Ube Industries, Ltd.] having a density of 0.92 g/cm³ and an MI (190° C.) of 2 g/10 min. The film was measured for properties. The results are shown in Table 3.

Comparative Example 9

A LLDPE single-layered film was obtained in the same manner as in Comparative Example 7 except that as the material for film there was used a linear low-density polyethylene [FA120N (trade name) manufactured by Ube Industries, Ltd.] having a density of 0.92 g/cm³ and an MI (190° C.) of 1.0 g/10 min. The film was measured for properties. The results are shown in Table 3.

Comparative Example 10

A PP single-layered film was obtained in the same manner as in Comparative Example 7 except that as the material for film there was used a crystalline polypropylene (PP) [RF395 (trade name) manufactured by Ube Industries, Ltd.] having a density of 0.91 g/cm³, an MFR (230° C.) of 9 g/10 min and a melting point of 138° C. The film was measured for properties. The results are shown in Table 3.

TABLE 2

| Film Structure | | Film Composition | |
|---|---|---|---|
| Total Thickness ($\mu$) | Ratio of Layer Thickness ($B_2$)/(A)/($B_2$) | A Layer | $B_2$ Layer |
| Examples | | | |
| 12 | 60 | 1/2/1 | Amorphous polyolefin/PP =50/50 | LDPE |
| 13 | 60 | 1/2/1 | Amorphous polyolefin/PP =50/50 | LLDPE |
| 14 | 60 | 1/2/1 | Amorphous polyolefin/PP =50/50 | VLDPE |
| 15 | 60 | 1/2/1 | Amorphous polyolefin/PP =50/50 | EVA |
| Comparative Examples | | | |
| 7 | 60 | — | | EVA |
| 8 | 60 | — | | LDPE |
| 9 | 60 | — | | LLDPE |
| 10 | 60 | — | | PP |

Note:
PP refers to a polypropylene
LDPE refers to a low-density polyethylene
LLDPE refers to a linear low-density polyethylene
VLDPE refers to a very-low-density polyethylene
EVA refers to an ethylene/vinyl acetate copolymer

TABLE 3

Film Properties

| | Tensile Yield Strength (23° C.) (kgf/cm²) | | Tensile Break Strength (23° C.) (kgf/cm²) | | Tensile Elongation (23° C.) (%) | | Tensile Modulus (23° C.) (Kgf/cm²) | | Tensile Modulus (80° C.) (Kgf/cm²) | | Ratio of Modulus 80°C./23° C. | | Haze (%) | Gloss (%) | Elmendorf Tear Strength (Kg/cm) | | Dart Impact (g/26 inch) | Heat-Sealing Temp. (°C.) |
|---|---|---|---|---|---|---|---|---|---|---|---|---|---|---|---|---|---|---|
| | *1 | *2 | *1 | *2 | *1 | *2 | *1 | *2 | *1 | *2 | *1 | *2 | | | *1 | *2 | | |
| Examples | | | | | | | | | | | | | | | | | | |
| 12 | — | — | 245 | 224 | 610 | 840 | 1014 | 1048 | 304 | 328 | 0.30 | 0.31 | 2.6 | 103 | 111 | 163 | 422 | 120 |
| 13 | 77 | 71 | 423 | 304 | 870 | 1040 | 972 | 1072 | 232 | 264 | 0.24 | 0.25 | 1.0 | 128 | 160 | 153 | NB⁽¹⁾ | 130 |
| 14 | 55 | 55 | 299 | 259 | 820 | 820 | 539 | 544 | 121 | 135 | 0.22 | 0.25 | 3.8 | 101 | 59 | 114 | NB⁽¹⁾ | 130 |
| 15 | 31 | 33 | 236 | 232 | 690 | 690 | 113 | 116 | 14 | 15 | 0.12 | 0.13 | 1.8 | 126 | 82 | 106 | NB⁽¹⁾ | 100 |
| Comparative Examples | | | | | | | | | | | | | | | | | | |
| 7 | 52 | 51 | 315 | 306 | 515 | 680 | 530 | 595 | (2) | (2) | (2) | (2) | 2.0 | 137 | 42 | 52 | 562 | 100 |
| 8 | — | 100 | 225 | 226 | 360 | 620 | 1647 | 1826 | 392 | 401 | 0.24 | 0.22 | 7.0 | 85 | 62 | 72 | 189 | 130 |
| 9 | 134 | 118 | 262 | 233 | 570 | 730 | 2200 | 2580 | 594 | 611 | 0.27 | 0.24 | 7.6 | 104 | 33 | 176 | 149 | 130 |
| 10 | 158 | 148 | 509 | 475 | 807 | 872 | 3460 | 3626 | 692 | 833 | 0.20 | 0.23 | 0.8 | 150 | 15 | 24 | 369 | 150 |

*Note*
⁽¹⁾NB refers to "not broken"
⁽²⁾Measurement was impossible because the sample was in a molten state.
*1 denotes the lengthwise direction
*2 denotes the crosswise direction As is clear from Examples 12–15 and Comparative Examples 7–10, the three-layered laminated films each consisting of one layer A and two layers $B_2$, as compared with the films of Comparative Examples 7–10, are well balanced in flexibility, heat resistance and mechanical strength and are sealable at low temperatures.

EXAMPLE 16

[Resin composition for layer A]

As the resin composition constituting the layer A, there was used the resin composition prepared in Example 1.

[Molding of laminated film]

There were used, for the layer A, the resin composition prepared above and, for the layer $B_3$, a resin composition obtained by mixing a crystalline polypropylene [RF395 (trade name) manufactured by Ube Industries, Ltd.] having a density of 0.91 g/cm³, an MFR (230° C.) of 9 g/10 min and a melting point of 138° C. and an ethylene/vinyl acetate copolymer (EVA) [Z289 (trade name) manufactured by Ube Industries, Ltd.] having an MI (190° C.) of 150 and an vinyl acetate content of 28%, at a weight ratio of 90/10 and then melt-kneading the mixture using an extruder.

The two resin compositions were subjected to melt three-layer co-extrusion using three independent extruders and a three-layer die connected to the extruders, so as to give a $B_3$/A/$B_3$ thickness ratio shown in Table 4; the resulting laminate was subjected to airing and quenching with a water-cooled sizing ring; the cooled laminate was subjected to blow-down molding into a tube-shaped film; the film was immediately wound, whereby a three-layered laminated film having a total thickness shown in Table 4 was obtained. The three-layered laminated film was measured for properties. The results are shown in Table 4. The composition of the film is shown in Table 5.

EXAMPLE 17

A three-layered laminated film having a total thickness shown in Table 4 was obtained in the same manner as in Example 16 except that in the resin composition for the layer $B_3$, the mixing ratio of the crystalline polypropylene and the ethylene/vinyl acetate copolymer was changed to 80/20. The three-layered laminated film was measured for properties. The results are shown in Table 4. The composition of the film is shown in Table 5.

EXAMPLE 21

A three-layered laminated film having a total thickness shown in Table 4 was obtained in the same manner as in Example 13 except that the resin composition for layer A was prepared by mixing the same crystalline polypropylene as used in Example 16 and a polybutene [M2481 (trade name) manufactured by Mitsui Petrochemical Industries, Ltd.] at a ratio of 50/50 and then melt-kneading the mixture using an extruder and that said resin composition was used as an intermediate layer of the laminated film. The three-layered laminated film was measured for properties. The results are shown in Table 4. The composition of the film is shown in Table 5.

TABLE 4

| | Film Structure | | Film Properties | | | | | | | | | | |
|---|---|---|---|---|---|---|---|---|---|---|---|---|---|
| | | | Tensile Yield Strength (23° C.) (kgf/cm$^2$) | | Tensile Break Strength (23° C.) (kgf/cm$^2$) | | Tensile Elongation (23° C.) (%) | | Tensile Modulus (23° C.) (kgf/cm$^2$) | | Wettability | Adhesivity | Haze |
| | Total thickness ($\mu$) | Ratio of Layer Thickness ($B_3$)/(A)/($B_3$) | *1 | *2 | *1 | *2 | *1 | *2 | *1 | *2 | (dyne/cm) | (g/24 mm) | (%) |
| Examples | | | | | | | | | | | | | |
| 16 | 60 | 1/2/1 | 122 | 107 | 419 | 320 | 777 | 867 | 1550 | 1520 | 43 | 580 | 0.7 |
| 17 | 60 | 1/2/1 | 102 | 92 | 399 | 293 | 1037 | 893 | 1280 | 1025 | 45 | 650 | 5.2 |
| 18 | 60 | 1/2/1 | 117 | 103 | 449 | 340 | 871 | 910 | 1320 | 1300 | 43 | 570 | 1.3 |
| 19 | 60 | 1/2/1 | 118 | 103 | 415 | 291 | 903 | 843 | 1200 | 1130 | 45 | 610 | 1.7 |
| 20 | 60 | 1/2/1 | 103 | 94 | 356 | 255 | 798 | 791 | 1180 | 1110 | 46 | 660 | 4.3 |
| 21 | 60 | 1/2/1 | 131 | 126 | 431 | 330 | 716 | 802 | 1700 | 1630 | 43 | 570 | 2.8 |
| Comparative Example | | | | | | | | | | | | | |
| 11 | 60 | — | 158 | 148 | 509 | 475 | 807 | 872 | 3460 | 3626 | 40 | 480 | 0.8 |

*1 denotes the lengthwise direction
*2 denotes the crosswise direction

EXAMPLE 18

A three-layered laminated film having a total thickness shown in Table 4 was obtained in the same manner as in Example 16 except that in the resin composition for the layer $B_3$, the mixing ratio of the amorphous polypropylene and the crystalline polypropylene was changed to 70/30. The three-layered laminated film was measured for properties. The results are shown in Table 4. The composition of the film is shown in Table 5.

EXAMPLE 19

A three-layered laminated film having a total thickness shown in Table 4 was obtained in the same manner as in Example 18 except that in the resin composition for the layer $B_3$, the mixing ratio of the crystalline polypropylene and the ethylene/vinyl acetate copolymer was changed to 85/15. The three-layered laminated film was measured for properties. The results are shown in Table 4. The composition of the film is shown in Table 5.

EXAMPLE 20

A three-layered laminated film having a total thickness shown in Table 4 was obtained in the same manner as in Example 18 except that in the resin composition for the layer $B_3$, the mixing ratio of the crystalline polypropylene and the ethylene/vinyl acetate copolymer was changed to 80/20. The three-layered laminated film was measured for properties. The results are shown in Table 4. The composition of the film is shown in Table 5.

TABLE 5

| | Film Composition | |
|---|---|---|
| | A Layer | $B_3$ Layer |
| Examples | | |
| 16 | B301H/RT2780 =50/50 | RF395/Z289 =90/10 |
| 17 | B301H/RT2780 =50/50 | RF395/Z289 =80/20 |
| 18 | B301H/RT2780 =30/70 | RF395/Z289 =90/10 |
| 19 | B301H/RT2780 =30/70 | RF395/Z289 =85/15 |
| 20 | B301H/RT2780 =30/70 | RF395/Z289 =80/20 |
| 21 | B301H/M2481 =50/50 | RF395/Z289 =90/10 |

As is clear from Examples 16–21, the three-layered laminated films of the present invention each consisting of one layer A and two layers $B_3$, are flexible and have excellent wettability and adhesivity.

As described above, the laminated films of the present invention are soft films which have good transparency, haze and gloss, which have excellent flexibility and mechanical strength, and which have high impact resistance, surface wettability and low-temperature sealability. Therefore, the present laminated films are applicable to various usages in place of soft vinyl chloride films which are raising social problems such as environmental pollution.

What is claimed is:

1. A laminated film having two outermost layers, the laminated film comprising,
   a non-fibrous layer A containing a resin composition comprising (i) 20–100% by weight of an amorphous polyolefin containing at least one component, in an amount of at least 50% by weight in said amorphous polyolefin, selected from the group consisting of propylene and butene-1 and (ii) 80-0% by weight of a crystalline polypropylene, and a layer $B_3$ containing a crystalline polypropylene and an ethylene (co)polymer resin having polarity, wherein at least one of the two outermost layers is the layer $B_3$.

2. A laminated film according to claim 1, wherein the two outermost layers are constituted each by the layer $B_3$.

3. A laminated film according to claim 2, wherein the amorphous polyolefin has a boiling-n-heptane insoluble of 70% by weight or less and a number-average molecular weight of 1,000–200,000.

4. A laminated film according to claim 3, wherein the amorphous polyolefin is at least one polyolefin containing propylene as a main component, selected from the group consisting of a polypropylene, a propylene/ethylene copolymer, a propylene/butene-1 copolymer, a propylene/hexene-1 copolymer, a propylene/butene-1/ethylene terpolymer, a propylene/hexene-1/octene-1 terpolymer and a propylene/hexene-1/4-methylpentene-1 terpolymer.

5. A laminated film according to claim 3, wherein the amorphous polyolefin is at least one polyolefin containing butene-1 as a main component, selected from the group consisting of a polybutene-1, a butene-1/ethylene copolymer, a butene-1/propylene copolymer, a butene-1/propylene/ethylene terpolymer, a butene-1/hexene-1/octene-1 terpolymer and a butene-1/hexene-1/4-methylpentene-1 terpolymer.

6. A laminated film according to claim 4 or 5, wherein the crystalline polypropylene used in the layer A is at least one polypropylene selected from the group consisting of a propylene homopolymer, a propylene/ethylene random or block copolymer containing an ethylene component in an amount of 1–30% by weight, and a propylene/butene-1 random or block copolymer containing a butene-1 component in an amount of 1–20% by weight 7. A laminated film according to claim 6, wherein the ethylene (co)polymer resin having polarity, used in the layer $B_3$ is a copolymer between ethylene and a vinyl monomer having a polar group, or a polymer obtained by grafting a vinyl monomer having a polar group, to an ethylene (co)polymer resin.

8. A laminated film according to claim 7, wherein the vinyl monomer is selected from the group consisting of vinyl acetate, ethyl acrylate, methyl acrylate and maleic anhydride.

9. A laminated film according to claim 7, wherein the weight ratio of the crystalline polypropylene and the ethylene (co)polymer resin having a polar group, both used in the layer $B_3$ is 98:2 to 50/50.

* * * * *

UNITED STATES PATENT AND TRADEMARK OFFICE
CERTIFICATE OF CORRECTION

PATENT NO.  :   5,342,695
DATED       :   August 30, 1994
INVENTOR(S) :   TSURUTANI et al.

It is certified that error appears in the above-identified patent and that said Letters Patent is hereby corrected as shown below:

On the title page, Item [73], add the third assignee -- Rexene Corporation, Dallas, Texas --.

Signed and Sealed this

Twenty-eight Day of February, 1995

Attest:

BRUCE LEHMAN

Attesting Officer   Commissioner of Patents and Trademarks